Aug. 11, 1931. W. M. UPDEGRAVE 1,818,660
MEANS FOR TESTING AND EXERCISING THE OCULAR MUSCLES
Filed May 23, 1929 3 Sheets-Sheet 1
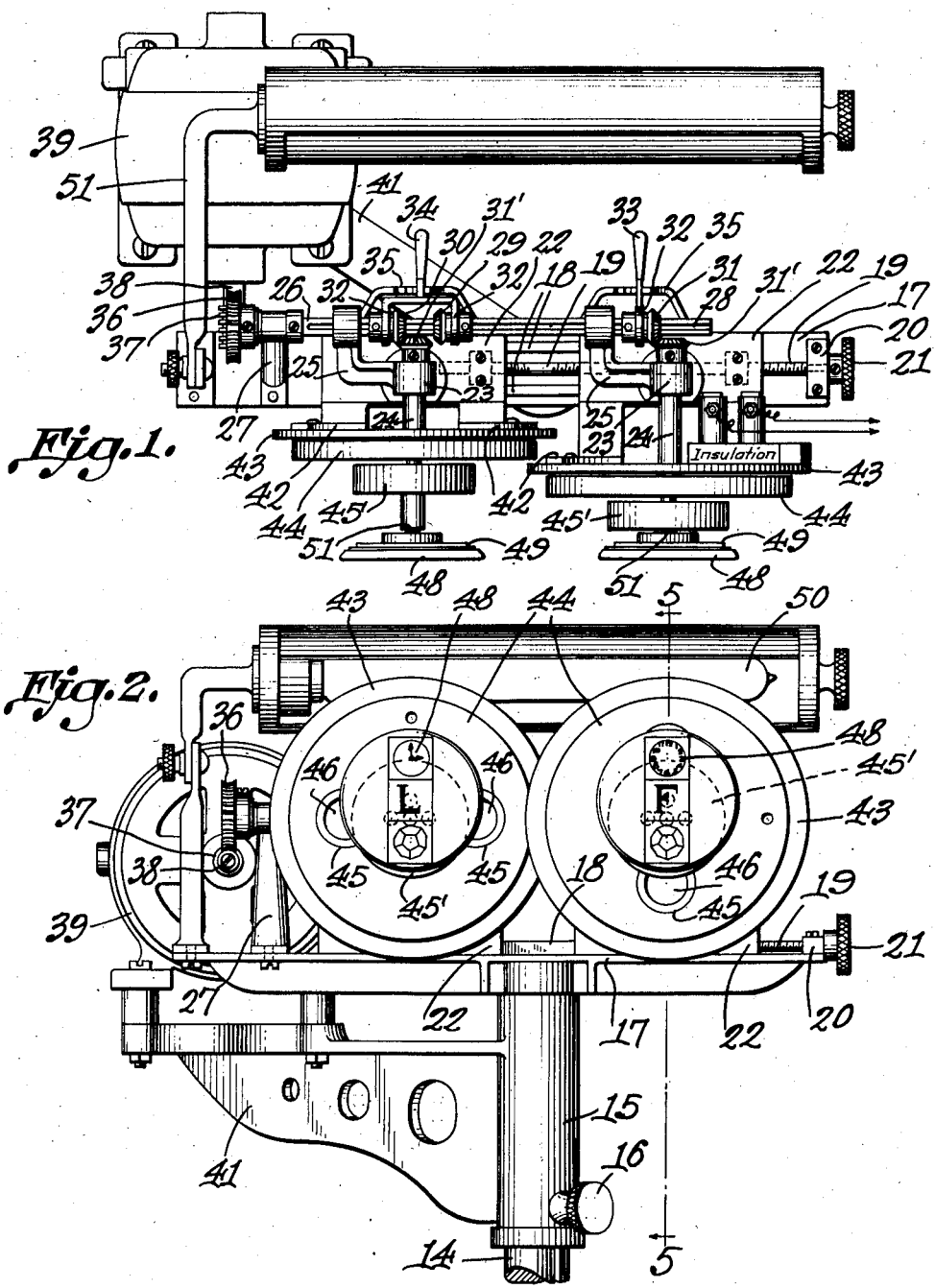

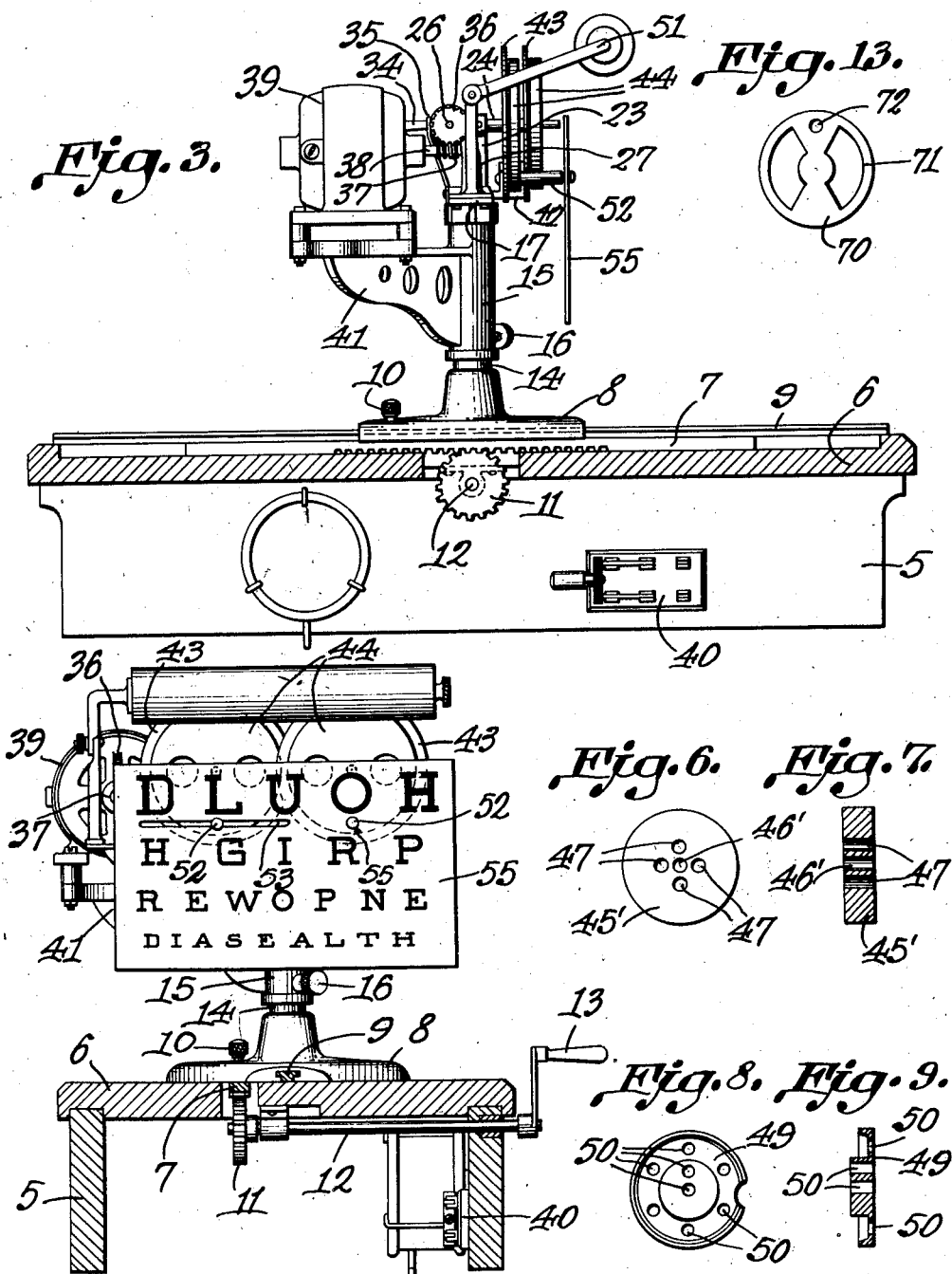

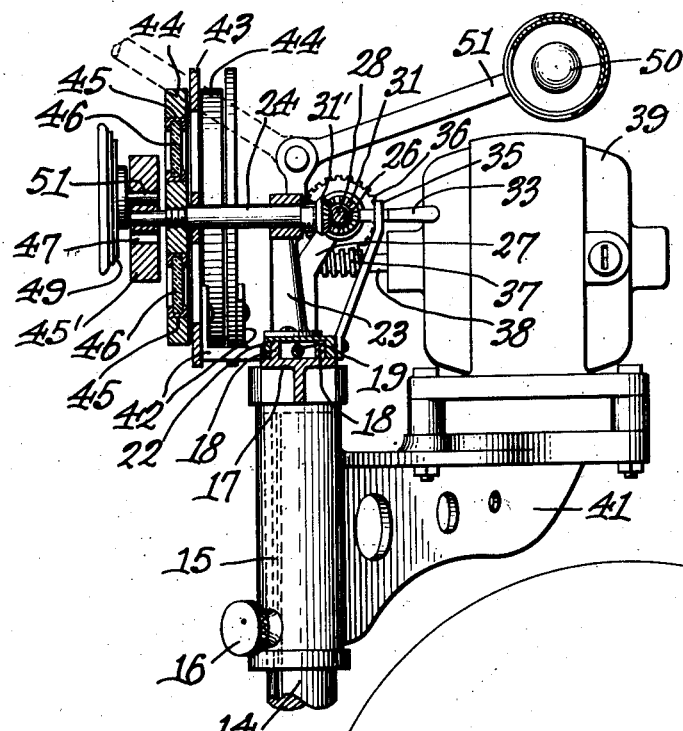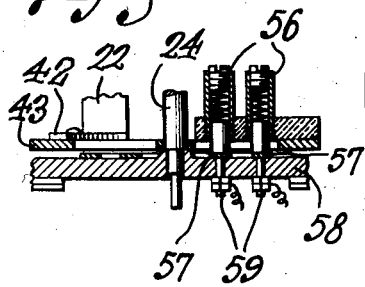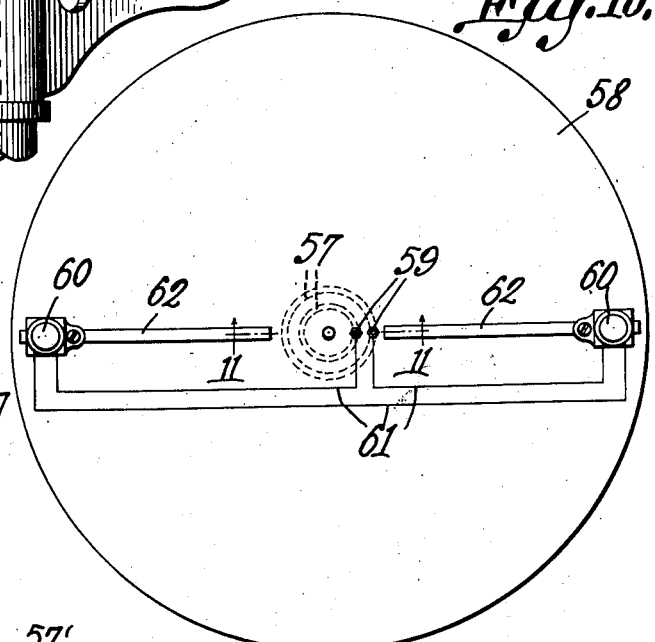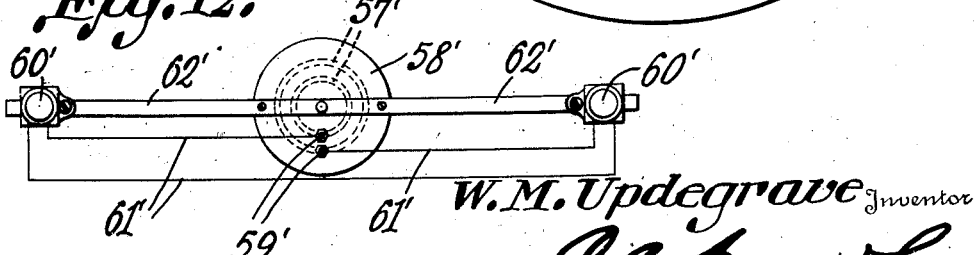

Patented Aug. 11, 1931

1,818,660

UNITED STATES PATENT OFFICE

WILLIAM MARSH UPDEGRAVE, OF JOHNSTOWN, PENNSYLVANIA

MEANS FOR TESTING AND EXERCISING THE OCULAR MUSCLES

Application filed May 23, 1929. Serial No. 365,374.

This invention relates to a method and means for testing, exercising and developing the ocular muscles of the eyes and to stimulate the intrinsic or ciliary muscles, the result being that a perfect muscular balance is insured, and eye strain and the resultant defective vision rectified and the error reduced.

Another object of the invention is to provide a machine embodying interchangeable movable objects to be viewed by the patient, the objects being adjustably mounted so that muscles of the eyes found to be strained or inactive may be stretched and returned to their normal or correct position by the patient's eyes following the movements of the objects, in an effort to centralize the objects viewed by both eyes.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of a machine constructed in accordance with the invention.

Figure 2 is a front elevational view of the upper portion of the machine.

Figure 3 is a side elevational view of the machine.

Figure 4 is a front elevational view of the machine.

Figure 5 is a section on line 5—5 of Figure 2.

Figure 6 is an elevational view of one of the removable supporting disks forming a part of the invention.

Figure 7 is a sectional view therethrough.

Figure 8 is a rear elevational view of one of the removable members positioned on the disk.

Figure 9 is a vertical sectional view therethrough.

Figure 10 is an enlarged elevational view illustrating a modified form of the invention.

Figure 11 is a sectional detail view of the electric contact means of the modified form of the invention, taken on line 11—11 of Figure 10.

Figure 12 is a rear elevational view illustrating a supporting arm for use in supporting electric lamps.

Figure 13 is an elevational view of a modified form of movable object.

Referring to the drawings in detail, the reference character 5 designates the base of the machine which may be of any suitable design, such as a cabinet or the like. This base includes a support 6 provided with a groove to accommodate the rack bar 7 which is secured to the adjustable base 8 that supports the machine, forming the subject matter of the invention. A track 9 is mounted on the support 6 and fits into a groove formed in the bottom of the adjustable base 8 so that the adjustable base 8 is guided in its movements longitudinally of the support 6.

Formed in the rack bar 7 and arranged in spaced relation, are openings to receive the end of the set screw 10 that extends through the adjustable base 8, so that an adjustable connection between the base 8 and rack bar 7 is provided to regulate the movement of the adjustable base 8 permitting the base 8 to be moved to various distances from the eyes of the patient under treatment.

Cooperating with the rack bar 7 is a pinion 11 carried on the shaft 12 that is mounted in suitable bearings positioned under the support 6, the shaft 12 being provided with a handle 13 so that by rotating the handle, rotary movement will be imparted to the pinion 11 to move the rack bar and adjustable base connected therewith. Extending upwardly from the adjustable base 8 is a post 14 on which the sleeve 15 is mounted, the sleeve being provided with a set screw 16 that extends through the sleeve to contact with the post 14 for holding the sleeve 15 in various positions of vertical adjustment on the shaft 14. At the upper end of the sleeve 15 is a cross arm 17 having a pair of integral ribs 18 formed longitudinally thereof, the ribs being disposed in spaced relation with each other providing a clearance for the adjusting screw 19 which is supported in the bearing 20 mounted at one end of the cross arm 17, thereby providing a finger piece 21 at one end of the adjusting screw so that the screw may be conveniently operated, for purposes to be hereinafter more fully described.

The reference character 22 designates adjustable members, each of which is provided with a threaded opening to accommodate threads of the adjusting screw 19, the threads of the adjusting screw 19 being oppositely disposed so that the adjusting members 22 may be moved towards or away from each other to adapt the device for a particular purpose, when the adjusting screw 19 is rotated by the operator.

Formed integral with the adjusting members 22 are upstanding posts 23 which posts have bearing openings to accommodate the shafts 24 that operate therein. These bearings also include laterally and rearwardly extended arms 25 that are also provided with bearings, the latter bearings supporting the shaft 26 that also extends through a bearing formed at the upper end of the arm 27, mounted at one end of the cross arm 17. Formed in the upper surface of the shaft 26 is a groove 28, which groove receives ribs formed on the beveled pinions 29, 30 and 31 respectively, so that these pinions 29, 30 and 31 are splined on the shaft 26. The shafts 24 are provided with pinions 31' disposed at their inner ends, so that rotary movement of the shaft 26 will be imparted to the shafts 24. Each of the pinions 29, 30 and 31 is provided with a collar formed with a groove to receive the yokes 32 of the controlling levers 33 and 34 respectively, so that by moving the levers 33 and 34, the pinions 29, 30 and 31 may be moved into and out of operation at the will of the operator.

Keepers 35 are arranged adjacent to the levers 33 and 34 so that the levers will be held in their positions of adjustment. Secured to one end of the shaft 26, is a pinion 36 that meshes with the worm 37 disposed at one end of the power shaft 38 of the motor 39 which is in circuit with a suitable source of electric supply, in the usual and well known manner.

It might be further stated, in connection with the electric circuit to the motor, that a knife switch 40 is provided so that the motor may be reversed at the will of the operator. The motor 39 is mounted on the arm 41 formed integral with the sleeve 15. Each of the adjustable members 22 is formed with arms 42 to which the circular members 43 are secured, which members are formed with central bearings in which the outer ends of the shafts 24 operate.

Secured to the outer ends of the shafts 24 are disk like members 44, which are provided with openings 45 in which suitable colored lenses indicated at 46 are positioned, for purposes to be hereinafter more fully described.

Employed in connection with the extended ends of the shafts 24, are supporting disks 45', each of which being provided with a central opening 46' and lateral openings 47, the openings being designed to fit over the extended ends of the shafts 24 in such a way that the supporting disks 45 may be adjusted to operate either eccentrically of the shafts or concentric therewith to carry out the purpose of the invention.

The objects observed by the patient under treatment, are indicated by the reference character 48, each of which objects embodies a solid disk like member 49 formed with a plurality of openings 50 that accommodate the pin 51 associated therewith, and because the openings are arranged in spaced relation with each other, it will be seen that the members 49 may be positioned to operate eccentrically or concentrically.

The covers for the objects observed by the patient may be formed in various ways, and in the present showing I have used covers on which various designs are employed, and as illustrated by Figure 2, the cover of one of the members is printed with the figures representing the dial of a clock.

A letter F is formed directly below the numbers indicating the dial of a clock and a design below the letter F, while on the opposite cover are formed hands of a clock and directly therebelow is the letter L and below the letter L a design corresponding to the design on the opposite cover. In the use of the device objects are observed through a stereoscope, and it will be obvious that when these members are properly adjusted, the hands shown on the cover illustrated by Figure 2 of the drawings, will be seen in a correct position on the dial indicated on the adjacent cover, and the letter L of one cover will fit accordingly over the letter F of the adjacent cover forming the letter E.

If the patient's eyes are not accurate, the hands will not line up properly with the dial, nor will the letter L properly align with the letter F to form the letter E, thereby indicating to the operator the condition of the patient's eyes. After the condition of the patient's eyes has been determined, the objects are adjusted to proper positions to cause the eyes while viewing the objects, to move in a direction to stretch the contracted muscles of the eyes which cause the defective vision, to the end that when the eyes are moved away from the machine, the muscles which have been exercised by viewing the moving objects, will move to their normal or correct positions, causing a perfect balance of these muscles and also stimulating the intrinsic or ciliary muscles which will lessen the error of refraction and in the majority of cases bring the eyes back to normal.

Should it be desired to use the instrument in exercising the muscles of the eyes by the use of light rays, the members 45' and 49 are removed and the machine rotated in the usual manner while the patient looks through the lenses of the disk-like members 44 at the light furnished by the lamp 50 which is supported on the arm 51 that is pivotally mounted at the upper part of the machine. This lamp may be shifted so that the light rays therefrom may fall directly onto the movable objects at the front of the machine, the arm 51 taking position as shown in dotted lines in Figure 5 of the drawings.

In carrying out another method of exercising the muscles of the eyes, the members 45' and 49 are removed and pins such as indicated at 52, are screwed into threaded openings formed in the members 44, the pins being provided with heads to fit within the elongated openings 53 and the opening 54 respectively of the chart 55, the chart being provided with letters of various sizes and colors to be viewed by the person under treatment.

Due to this construction, it is obvious that when the machine is put into operation, the chart will be moved in a rotary or circular direction, at the same time rocked in a vertical plane.

It is contemplated to employ movable lights to be observed by the patient, and with this end in view I have provided one of the members 43, with contact members 56 to sweep the contact rings 57 formed on the rotary member 58 which is removably supported on the shaft 24 associated therewith as shown by Figure 11. These rings 57 are in circuit with the posts 59 that in turn are in circuit with lamps 60, through the wires 61, the lamps 60 being adjustably supported on the ribs 62 that are removably secured to the rotary member 58, which may be used as a perimeter to test colorfield of eyes. It might be further stated that in the use of the device, either one of the rotary members may be thrown into operation, for testing one eye, or both of the rotary members may be thrown into operation for testing both eyes, in a manner as described.

In the form of the invention as shown by Figure 12, the supporting member is indicated by the reference character 58', and is provided with contact rings 57' that are swept by the contact posts 59' that are in circuit with the lamps 60' through the wires 61'.

A supporting rod 62' is mounted on the member 58' and has its ends extended beyond the edge of the member 58'. Thus it will be seen that as the member 58' is rotated, the lamps on the ends of the bar 62' will rotate. It might be further stated that these lamps 60' are adjustably held on the bar 62', so that they may be adjusted towards and away from each other to meet various requirements.

The supporting member shown by Figure 13 of the drawings, is disk-like in formation and is indicated by the reference character 70, the supporting member being provided with lateral cut out portions 71 causing the supporting member to be heavy at its lower end, so the device remains perpendicular while revolving to the end that objects moving past the openings 71 may be viewed therethrough. An opening 72 is formed in the supporting member and accommodates a pin on which the supporting member is mounted, the pin being slightly smaller than the opening 72 to allow the supporting member to move freely thereon with the result that as the device is rotated, a swinging movement of this supporting member will take place.

The pin that passes through the opening 72, may be positioned in the openings 47 of the supporting disk 45'.

In carrying out the method involving the invention, the patient views the movable objects through the stereoscope, and the normal eyes having the muscles that move the eye balls in perfect balance, will show the letters or figures of the movable objects perfectly balanced, whereas unbalanced eye muscles will distort or confuse the figure, letter, or object, throwing them off center in either lateral direction, depending upon which of the muscles are weak. After it has been determined by the foregoing test, which muscles of the eyes are weak, it is necessary, in carrying out the method to exercise and strengthen or develop the weak muscles.

This is accomplished by causing the machine to revolve the objects viewed which has been found in practice to accomplish the exercising and strengthening of the muscles, because of the unconscious relaxation and stimulation of the muscles which is brought about in viewing the objects in motion, with the result that the centralization of the objects takes place, the muscles of the eyes being at the same time exercised in the rotary motion given the objects viewed, which motion may be in a given direction, or the objects may be moved in opposite directions simultaneously.

I claim:

1. In a device of the class described, a main support, laterally adjustable supporting members on the main support, said supporting members having a plurality of openings, charts to be viewed by a person having an eye test, pins extending from the charts and extending into the openings of the supporting members to adjustably support the charts, and means for rotating the supporting members to rotate the charts.

2. In a device of the class described, a support, a base mounted on the support, means for moving the base longitudinally of the support, rotary shafts mounted on the base, supporting disks having a plurality of openings adapted to be positioned on the shafts, removable pins positioned in the openings, disk-like members having openings to receive the pins to adjustably mount the disk-like members, pins removably mounted in openings of the disk-like members, and means for rotating the shafts.

3. In a device of the class described, a support, a base mounted for movement longitudinally of the support, horizontal shafts mounted on the base, said shafts being arranged in parallel spaced relation with each other, supporting members having openings to accommodate the shafts, said openings being arranged in the line of a circle, disks having a plurality of openings, pins in the openings of the supporting members and adapted to extend into the openings of the disks to adjustably mount the disks on the supporting members, and means for operating the shafts to rotate the disks in opposite directions or in the same direction.

4. In a device of the class described, a support, a base mounted on the support, parallel rotary shafts mounted on the base, supporting members removably mounted on the shafts and having a plurality of openings to receive the shafts, supporting disks, pins positioned in the openings to removably support the disks, pins mounted in the openings of the disks, and a chart having openings to receive the pins of the disks, to mount the chart for rotary movement.

In testimony that I claim the foregoing as my own, I have hereto affixed my signature.

WILLIAM MARSH UPDEGRAVE.